| United States Patent [19]
Hara | [11] Patent Number: 5,255,964 |
| | [45] Date of Patent: Oct. 26, 1993 |

[54] SHOE OF CRAWLER BELT OR CHAIN

[75] Inventor: Yoshiaki Hara, Hadano, Japan

[73] Assignee: The Yokohama Rubber Co., Ltd., Tokyo, Japan

[21] Appl. No.: 889,395

[22] Filed: May 28, 1992

[30] Foreign Application Priority Data

May 29, 1991 [JP] Japan .............. 3-039399[U]

[51] Int. Cl.$^5$ .................................... B62D 55/26
[52] U.S. Cl. ................................. 305/46; 305/51
[58] Field of Search ............ 305/35 R, 38, 39, 46, 305/51, 54

[56] References Cited

U.S. PATENT DOCUMENTS

| 2,917,348 | 12/1959 | Reuter et al. | 305/38 |
| 3,261,646 | 7/1966 | Pax | 305/35 R |
| 4,448,459 | 5/1984 | Kortering et al. | 305/38 |
| 4,470,641 | 9/1984 | Swarthout | 305/54 X |
| 4,844,561 | 7/1989 | Savage et al. | 305/35 R |

FOREIGN PATENT DOCUMENTS

| 1145567 | 10/1957 | France | 305/39 |
| 2-49689 | 4/1990 | Japan . | |
| 2-96381 | 8/1990 | Japan . | |
| 2-96382 | 8/1990 | Japan . | |
| 2-96383 | 8/1990 | Japan . | |
| 2-96384 | 8/1990 | Japan . | |
| 794074 | 4/1958 | United Kingdom | 305/51 |

*Primary Examiner*—Russell D. Stormer
*Attorney, Agent, or Firm*—Finnegan, Henderson, Farabow, Garrett & Dunner

[57] ABSTRACT

A crawler shoe used in an endless track vehicle having metal shoes made of iron or the like. The metal shoe has two integral projections projecting toward the ground contact side of the shoe. A resilient shoe made of rubber or the like is integrally molded and fixed to the metal shoe around the projections. A reinforced member is embedded in the elastic shoe between two adjacent projections.

5 Claims, 2 Drawing Sheets

SHOE OF CRAWLER BELT OR CHAIN

BACKGROUND OF THE INVENTION

1. Field of the Invention

This invention relates to a shoe for a crawler belt or chain, hereinafter referred to as "crawler shoe" used in an endless track vehicle, such as a construction or agricultural machine or the like.

2. Description of the Related Art

As shown in FIG. 2, in the prior art, such an endless track vehicle has crawler belts or chains, each of which has a plurality of crawler shoes 10 mounted thereon. Each crawler shoe 10 comprises a metal shoe 11 made of iron or the like having a plurality of integral projections 11a, 11b that project towards the ground contact side of the shoe and an elastic shoe 12 made of a rubber or the like, integrally molded and fixed to the metal shoe 11 around the projections on its ground contact side, so as to prevent a paved road from being damaged by the crawler shoe 10. The elastic shoe 12 and the metal shoe 11 of the crawler shoe 10 have bolt inserting screw holes (not shown) that penetrate through them for mounting one on the other. The crawler shoes 10 are connected to each other, in turn, by means of links 30 and pins 20 with bolts and nuts to constitute an endless crawler belt or chain.

In such a conventionally known crawler shoe 10, elastic shoe 12 has rounded or convex portions 13 on the surface of the respective ends of the shoe in the traveling direction (i.e., at the corners or intersections between the side surfaces 14 that extend in a direction transverse to the traveling direction and the ground contact surface 15). As shown, there is a difference between the rubber thickness of the elastic shoe 12 above the projections 11a and 11b and the rubber thickness of the elastic shoe 12 in the areas between the projections. Thus, when the elastic shoe 12 comes into contact with a road surface 50, the stresses exerted on the rubber will be concentrated in the areas above the projections.

In addition, when a crawler shoe 10, extended around a driving or idler sprocket 40, comes into contact with a road surface 50 at a "final link plunge angle $\theta$", the leading rounded end portion 13 of the elastic shoe 12 in the traveling direction will strike the road first and be compressed between the road surface 50 and a first projection 11a on the metal shoe 11. This subjects the rubber around this portion 13 to an expansion strain or deformation due to the shearing forces encountered.

The "final link plunge angle $\theta$" is the angle of a link 30 when the immediately preceding link 30a is in a position parallel to the road surface 50 and its shoe 12a is in contact with the surface and is represented as follows: $\theta = 360°/n$, where n = number of links that would fit around sprocket 40.

Therefore, during traveling on a gravel road, if pebbles or the like on the road are encountered by the leading side faces 14 of the elastic shoes 12, the rubber there will be deformed and sometimes a part of the rubber may be broken off.

SUMMARY OF THE INVENTION

An object of the present invention is to provide a crawler shoe in which the concentration of forces exerted on the elastic shoe in the areas adjacent the projections can be moderated and the shearing rigidity of the end portions of the shoe in the traveling direction can be increased.

Another object of the present invention is to provide a crawler shoe in which the drawbacks as mentioned above with reference to the prior art can be overcome.

According to the present invention, there is provided a crawler shoe for use with a plurality of other crawler shoes pivotally linked together to form a chain of shoes for use with an endless track vehicle, said crawler shoe having a ground contact side facing toward a ground surface and comprising a metal shoe having integrally formed thereon at least two spaced projections projecting toward said ground contact side and an elastic shoe integrally molded and fixed to said metal shoe over said projections on its ground contact side, said elastic shoe having a ground contact surface and a hard reinforced member embedded in said elastic shoe between two adjacent projections.

In the crawler shoe according to the present invention, the difference in the thickness of the resilient or rubber shoe in the areas or portions above the projections and in the areas or portions between the projections is reduced. Therefore, when the shoe comes into contact with a road surface, stress concentrations will be moderated.

In addition, at the final link plunge angle, the shearing rigidity of the elastic shoe in the portion contacting the road surface is increased.

DESCRIPTION OF THE PREFERRED EMBODIMENTS

The present invention will now be described in detail with reference to the embodiment shown in FIG. 1.

Figure 1:
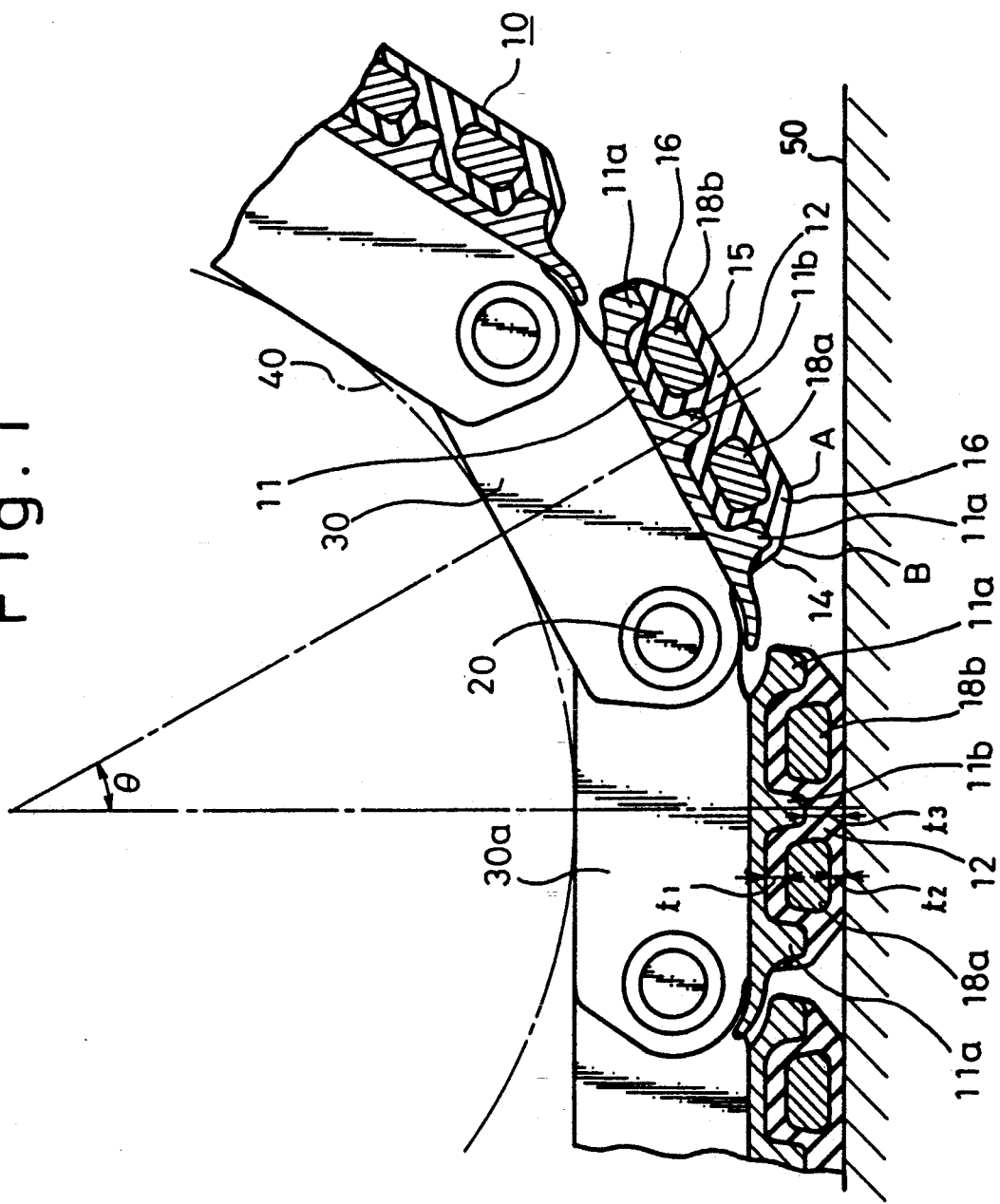
FIG. 1 is a cross-sectional view of a crawler belt having a plurality of crawler shoes constructed according to the present invention, illustrating one shoe in contact with the road surface and the immediately following one at a plunge position.
Figure 2:
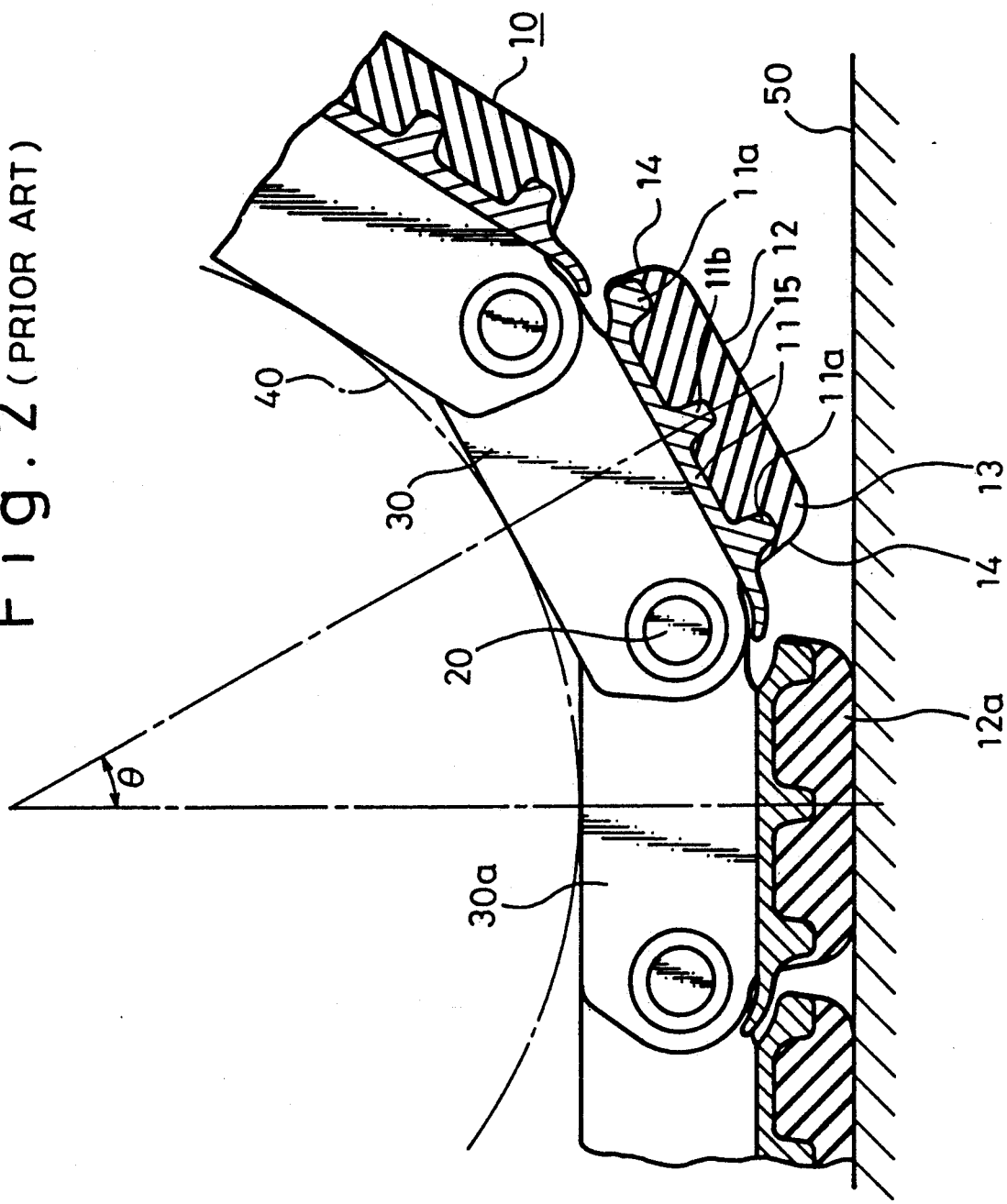
FIG. 2 is a cross-sectional view of a conventionally known crawler belt, illustrating one shoe in contact with the road surface and another at a plunge position.

In the crawler shoe 10 shown in FIG. 1, the parts or elements corresponding to those shown in FIG. 2 are indicated by the same reference numerals.

Crawler shoe 10 has a metal shoe 11 which is provided, at the respective end portions thereof in the traveling direction and in a central portion, with three integral projections 11a and 11b that project outwardly from the metal shoe 11 toward the ground contact side of the shoe and the ground surface and extend in a longitudinal direction transverse to the traveling direction of the shoe. In accordance with the invention, two hard reinforced members 18a and 18b are buried or embedded and sealed in during vulcanization the resilient shoe 12 in the areas between adjacent projections 11a and 11b. These reinforced members 18a and 18b are buried in such a manner that they are spaced from each other in the longitudinal direction of the elastic shoe 12, except for the areas around the mounting bolt screw holes (not shown).

The relationship between the rubber thicknesses $t_1$ and $t_2$ of the elastic shoe 12 at the location where the reinforced members 18a and 18b are buried in the elastic member 12 between the projections 11a at the end portions of the shoe in the traveling direction and the projection 11b in a central portion and the rubber thickness $t_3$ of the resilient shoe 12 at the area adjacent or above projection 11b, which thicknesses are fixed by the thicknesses of the reinforced members 18a and 18b, is defined as follows:

$$0.5\, t_3 \leq (t_1 + t_2) \leq 2.0\, t_3, \text{ preferably}$$

$$0.8\, t_3 \leq (t_1 + t_2) \leq 1.3\, t_3$$

If $(t_1+t_2) < 0.5 t_3$, the rubber thickness is so small that the resilient effect of the rubber shoe cannot be realized. On the other hand, if $(t_1+t_2) > 2.0\, t_3$, the thickness of the reinforced member is so small that stresses will be unfavorably concentrated in the rubber at the areas above the projections 11a and 11b.

The depth of the reinforced members 18a and 18b (i.e., their position in the resilient shoe 12 relative to the thickness thereof) is such that, if the projections 11a and 11b and the reinforced members 18a and 18b have their upper ends or surfaces extending in the circumferential direction of the crawler belt 10, at least a part of the reinforced members 18a and 18b will extend beyond and be nearer to the ground contact surface 15 of the shoe than the upper surface of the projections 11a and 11b.

Contrary to this, if the depth of the reinforced members 18a and 18b is less or more than this relative to the projections 11a and 11b, the shearing rigidity of the elastic shoe 12 is unfavorably reduced compared with that obtained from the structure mentioned above.

The material of the above-mentioned reinforced members 18a and 18b can be selected from a metal, such as iron, a fiber reinforced plastic (FRP), a plastic or the like.

The outer surface of elastic shoe 12 of crawler belt 10 has tapered surfaces 16 at the intersections between the vertical side faces 14 at the ends of the shoe in the traveling direction and its ground contact surface 15, which on contact is horizontal with respect to the traveling direction. In other words, on the outer surfaces of the shoes in its end portions that are above or vertically opposite from projections 11a.

The intersection point A of the ground contact surface 15 of elastic shoe 12 with tapered surface 16 is located nearer to the central portion of the resilient shoe 12 in the traveling direction than the corresponding projection 11a. In addition, tapered surface 16 has a predetermined inclination such that the end point A of the ground contact surface 15 is nearer to the road surface 50 than the surfaces of elastic shoe 12 in the vicinity of the projection 11a when the crawler shoe is at a position of a final link plunge angle.

In the embodiment shown, although the entire bodies of the reinforced members 18a and 18b are embedded in the elastic shoe 12, the upper surfaces thereof may be exposed on the ground contact surface 15. Also, although the ground contact surface 15 of the elastic shoe 12 has a flat surface as shown in the drawing, it may be formed as a convex surface.

The other portions of the crawler shoe are the same as those shown in FIG. 2, and therefore will not be explained in further detail.

According to the present invention, the rubber thickness of the resilient shoe 12 in the areas between two adjacent projections 11a and 11b is reduced compared with that in the prior art and, therefore, the differences in the thickness of the shoe in these areas compared to the thickness of the resilient shoe in the portions above the projections will be minimized. As described, this is a result of the reinforced members 18a and 18b being disposed between the projection 11a of the metal shoe 11 at the end portions thereof in the traveling direction and the projection 11b in a central portion thereof.

Therefore, the difference in the coefficient of elasticity of the rubber of the elastic shoe 12 in the areas above or adjacent projections 11a and 11b and the areas between the projections can considerably be reduced. Thus, when an elastic shoe 12 comes into contact with the road 50, the stress concentrations exerted on the rubber in the portions adjacent the projections 11a and 11b will be dispersed and moderated.

Also, in the crawler belt 10 constituted as mentioned above, the portion of the elastic shoe 12 in the areas between projection 11a and the ground contact surface constituted by the tapered surface 16 does not contact the road surface 50, at the time of final plunge angle $\theta$. Rather, the end point A of the ground contact surface 15 located nearer to the center of the shoe first comes into contact with the road surface 50. Therefore, the shearing forces around these portions are reduced and these portions will be subjected mainly to compression forces. In particular, the shearing rigidity of the resilient shoe 12 in the areas between the projections 11a and 11b will be higher due to the reinforced members 18a and 18b and almost no strain due to shearing forces will be generated in the elastic shoe 12 in the areas adjacent the projections 11a.

Therefore, during traveling on a gravel road, even if pebbles or the like on the road are encountered by the side faces 14 of the resilient shoes 12, the rubber there will not be damaged.

In the above-mentioned embodiment, although the tapered surfaces 16 are formed on the resilient shoe 12 in the regions above the projections 11a of the metal shoe 11 at its ends in the traveling direction, the cross-sectional shape of the elastic in this areas can optionally be different from that mentioned above.

It should be understood by those skilled in the art that the foregoing description relates to only a preferred embodiment of the disclosed invention, and that various changes and modifications may be made to the invention without departing from the spirit and scope thereof.

I claim:

1. A crawler shoe for use with a plurality of other crawler shoes pivotally linked together to form a chain of shoes for use with an endless track vehicle, said crawler shoe having a ground contact side facing toward a ground surface and comprising a metal shoe having integrally formed thereon at least two spaced projections projecting toward said ground contact side and an elastic shoe integrally molded and fixed to said metal shoe over said projections on its ground contact side, sad elastic shoe having a ground contact surface and a hard reinforced member embedded in said elastic shoe between two adjacent projections.

2. The crawler shoe of claim 1, wherein said metal shoe has at least three projections, a first and second at the leading and trailing ends respectively of the metal shoe with respect to its direction of travel, and a third in a central portion thereof, there being at least two of said reinforced members located between adjacent projections.

3. The crawler shoe of claim 2, wherein the total of the thickness of said elastic shoe between a reinforced member and the ground contact surface thereof and between the reinforced member and the ground contact side of the metal shoe is from 0.5 to 2.0 times the thickness of the elastic shoe between an upper surface of said third projection located in the central portion of the elastic shoe and the ground contact surface of the elastic shoe.

4. The crawler shoe of claim 2, wherein said elastic shoe has vertical side surfaces at its leading and trailing ends with respect to the direction of travel of the crawler shoe and the ground contact surface is located between said ends in a central portion thereof and tapered surfaces at either end extending from an intersection point with said leading and trailing side surfaces, over said first and second projections at said ends of the metal shoe, to an intersection point with said ground contact surface that is nearer to the central portion of the elastic shoe than said first and second projections, said intersection point with the ground contact surface of the elastic shoe being closer to the ground surface than said intersection point with said side surfaces when the ground contact surface of the immediately preceding crawler shoe relative to the direction of travel of said crawler shoe is in contact with said ground surface.

5. The crawler shoe of claim 1, wherein an upper surface of said reinforced member is closer to the ground contact surface of the elastic shoe than an upper surface of said projections is to said ground contact surface.

* * * * *